United States Patent [19]

Crea

[11] Patent Number: 4,492,627
[45] Date of Patent: Jan. 8, 1985

[54] RECOVERY OF PHOSPHORUS FROM WASTE PONDS

[75] Inventor: David A. Crea, Pocatello, Id.

[73] Assignee: FMC Corporation, Philadelphia, Pa.

[21] Appl. No.: 387,911

[22] Filed: Jun. 14, 1982

[51] Int. Cl.³ .................... B03B 7/00; B03B 1/02; B04C 5/24
[52] U.S. Cl. .................... 209/3; 209/11; 209/17; 209/211; 23/308 R
[58] Field of Search .................... 209/211, 3, 17, 2, 10, 209/11; 423/322, 323; 23/308, 293

[56] References Cited

U.S. PATENT DOCUMENTS

| | | | |
|---|---|---|---|
| 2,123,554 | 7/1938 | Klosky | 23/223 |
| 2,135,486 | 11/1938 | Almond | 23/223 |
| 3,004,834 | 10/1961 | Harnisch et al. | 23/293 |
| 3,084,029 | 4/1963 | Barber et al. | 23/223 |
| 3,104,952 | 9/1963 | Hartig | 23/293 |
| 3,113,839 | 12/1963 | Barber et al. | 23/165 |
| 3,476,570 | 11/1969 | Moustafa | 23/308 |
| 3,485,356 | 12/1969 | Burr | 209/3 |
| 3,666,442 | 5/1972 | Layne et al. | 209/2 |
| 3,677,475 | 7/1972 | Dancy | 209/17 |
| 3,684,461 | 8/1972 | Muller et al. | 23/293 R |
| 3,950,030 | 4/1976 | Girden | 209/458 |
| 3,990,885 | 11/1976 | Baille et al. | 209/10 |
| 4,244,813 | 1/1981 | Moyer | 209/10 |

Primary Examiner—Frank W. Lutter
Assistant Examiner—Wm. Bond
Attorney, Agent, or Firm—Frank Ianno; Eugene G. Seems

[57] ABSTRACT

Process for recovery of elemental phosphorus from waste ponds by dredging the waste pond to obtain an aqueous phosphorus slurry, separating particles larger than 2 mm from the slurry, treating the remaining slurry in an initial hydrocyclone and removing an overflow of solids larger than 500 micrometers, treating the underflow from the initial hydrocyclones in smaller diameter hydrocyclones, removing a second overflow enriched in slimes and diminished in phosphorus, removing a second underflow enriched in phosphorus and diminished in slimes and heating it sufficiently to melt the phosphorus therein, treating the heated second underflow in a centrifugal separator, and separating and recovering a stream of coalesced phosphorus from a heavy fraction of impurities.

6 Claims, 3 Drawing Figures

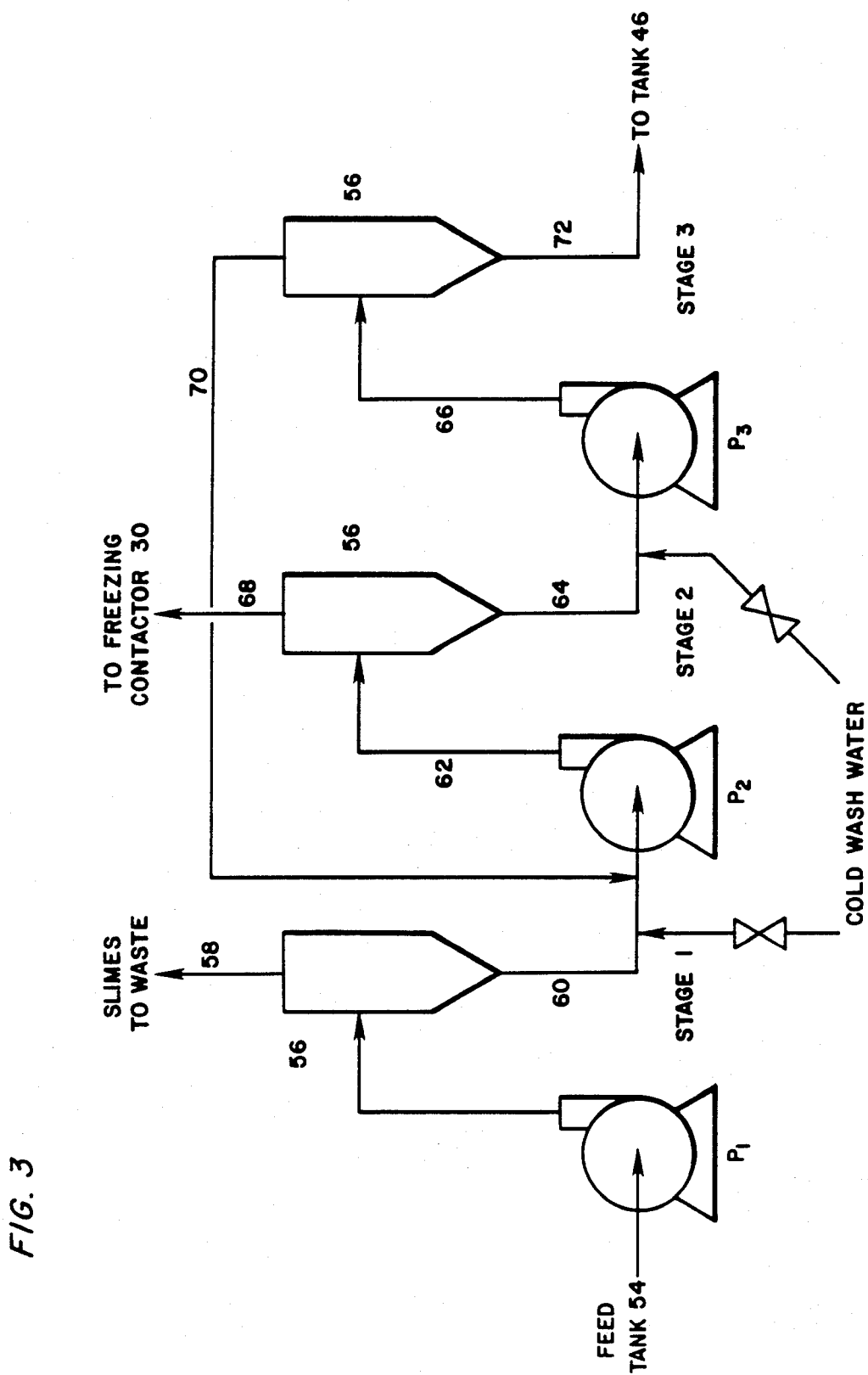

RECOVERY OF PHOSPHORUS FROM WASTE PONDS

The present invention relates to a process for the recovery of elemental phosphorus from waste ponds which are formed during the process of producing phosphorus from phosphate ores. In conventional operations, elemental phosphorus is produced by reacting phosphate ore with carbon at high temperature in an electric furnace. In the operation of such furnaces, the phosphate ore is typically agglomerated, calcined and fed into the furnace with coke to supply carbon, and silica to act as a fluxing agent. Graphite electrodes suspended within the furnace are in contact with the furnace feed and form a melt zone at the base of the electrodes where the phosphate ore is reduced to phosphorus.

In order to prepare the phosphate ore for use in the furnace, the ore is crushed, agglomerated by briquetting or pelletizing, and then is sintered or calcined into compact shapes to remove volatile elements from the ore. This procedure for preparing phosphate ore into briquettes suitable for use in a phosphorus furnace, is described in U.S. Pat. No. 3,760,048 issued on Sept. 18, 1973 in the names of James K. Sullivan et al.

The resulting phosphorus which is formed is vaporized, removed from the furnace, cleaned by electrostatic precipitators and condensed in one or more condensation steps by direct contact with water to form an aqueous slurry of phosphorus. The resulting phosphorus condensate separates when settled in collection sumps or tanks into three layers; a bottom layer of the desired elemental phosphorus, an intermediate layer of phosphorus sludge, and an upper layer of water containing dissolved phosphorus and fine particulate phosphorus.

The phosphorus sludge layer is an emulsion of phosphorus and water with varying amounts of fine dirt slimes mostly in the water phase, and some larger, gritty, abrasive material. The average composition is about 50% by weight phosphorus, 40% by weight water and about 10% by weight dirt. The phosphorus sludge emulsion is believed to be stabilized mainly by very fine dirt slimes which separate the phosphorus globules and by polymeric phosphorus sacs around the globules with the indicated formula $(P_4OH)_n$. These sacs form a membrane around the globules. The outer surface is hydrophilic (attracted to water) and along with the slimes prevents globule coalescence.

Organic tars and dirt trapped within the condensed phosphorus globules are additional stabilizing agents. The fine dirt from the electric furnace is carried with the gas through the electrostatic precipitators. It is believed that the polymeric phosphorus sacs are formed typically from air leakage into the furnace, precipitator, and condenser system.

To recover the phosphorus from the phosphorus sludge, prior workers utilized such techniques as decantation (to permit as much phosphorus as possible to settle from the sludge layer), distillation of the sludge to vaporize the phosphorus, flocculating agents to settle the sludge such as animal glue, alum and the like and finally, centrifugation of the sludge to separate the phosphorus content of the sludge layer. An additional treatment is oxidation of the film by oxidizing agents, for example, chromic acid and the like. Of these, centrifugation appears to be cost effective for separating the greatest amount of phosphorus possible commensurate with the expense and time for carrying out such sludge treatment. This is described in U.S. Pat. No. 3,084,029 issued on Apr. 2, 1963 in the names of Barber et al.

In this process of centrifuging the phosphorus sludge to recover phosphorus, unfortunately, small phosphorus globules are unavoidably swept up and out of the centrifuge along with the slimes. The phosphorus thus lost, in amounts up to 15%, is a substantial amount of the feed phosphorus which, after being unavoidably swept out with slimes into the centrifuge waste water stream, is placed in outside waste ponds for storage.

The phosphorus in these centrifuge waste water ponds settles, cools and solidifies with trapped dirt and becomes even more difficult to recover. Because it has not been found possible to recover such waste phosphorus, heretofore, the phosphorus contents thereof have been ignored as a valuable asset.

Attempted recovery processes have been difficult because of the properties of phosphorus and its physical condition in the ponds. Much of the phosphorus exists as a viscous ooze of finely divided frozen phosphorus particles and dirt slimes, but the rich deposits near the banks are frozen into hard layers or sometimes huge blocks of solid, pure phosphorus, the whole being contaminated with sand, rocks and natural debris. Phosphorus burns on contact with air, so that the ponded material cannot be dried and excavated with normal earth moving equipment, but must be handled as a water slurry, with some of the processing equipment sealed with inert atmosphere. Safety of plant personnel is also of paramount importance because of the very hazardous nature of the material.

Accordingly, it is most desirable to find a technically feasible, economically sound process for recovering such waste phosphorus in order to reduce the amount of phosphorus lost in such ponds and to minimize any environmental problems by diminishing the size and number of such waste ponds.

In accordance with the present invention, it has been found that phosphorus can be recovered from these waste ponds by dredging the waste pond to obtain an aqueous slurry containing comminuted phosphorus-containing particles, screening an oversize fraction containing particles larger than about 2 mm from an undersized fraction in said slurry, feeding the undersized fraction of said slurry into an initial hydrocyclone and removing a first underflow stream having phosphorus-containing solids larger than about 500 micrometers, removing a first overflow stream from said initial hydrocyclone rich in phosphorus and slimes, introducing the first overflow stream into a plurality of hydrocyclones, each having a diameter less than the initial hydrocyclone, removing a second overflow stream from at least one of the plurality of hydrocyclones diminished in phosphorus and enriched in slimes, removing a second underflow stream from at least one of the plurality of hydrocyclones enriched in phosphorus and diminished in slimes, heating this second underflow stream sufficiently to melt the phosphorus therein, introducing the second underflow stream containing molten phosphorus into a centrifugal separator, removing a coalesced phosphorus stream as product from said separator and a heavy fraction of dirt containing minor amounts of residual phosphorus as a waste stream.

In a preferred embodiment of the invention, the oversized fraction containing particles larger than about 2 mm is heated above the melting point of phosphorus and screened to separate an aqueous dispersion of molten phosphorus from particles of dirt larger than 2 mm. The aqueous dispersion of molten phosphorus is cooled to form a chilled stream containing frozen phosphorus, and the chilled stream is fed along with the undersized fraction of said slurry, previously separated, into the initial hydrocyclone. The remainder of the process is unchanged.

BRIEF DESCRIPTION OF THE DRAWINGS

In the drawings,

FIG. I illustrates a flow sheet for carrying out the process steps of the present system.

Figure 1:
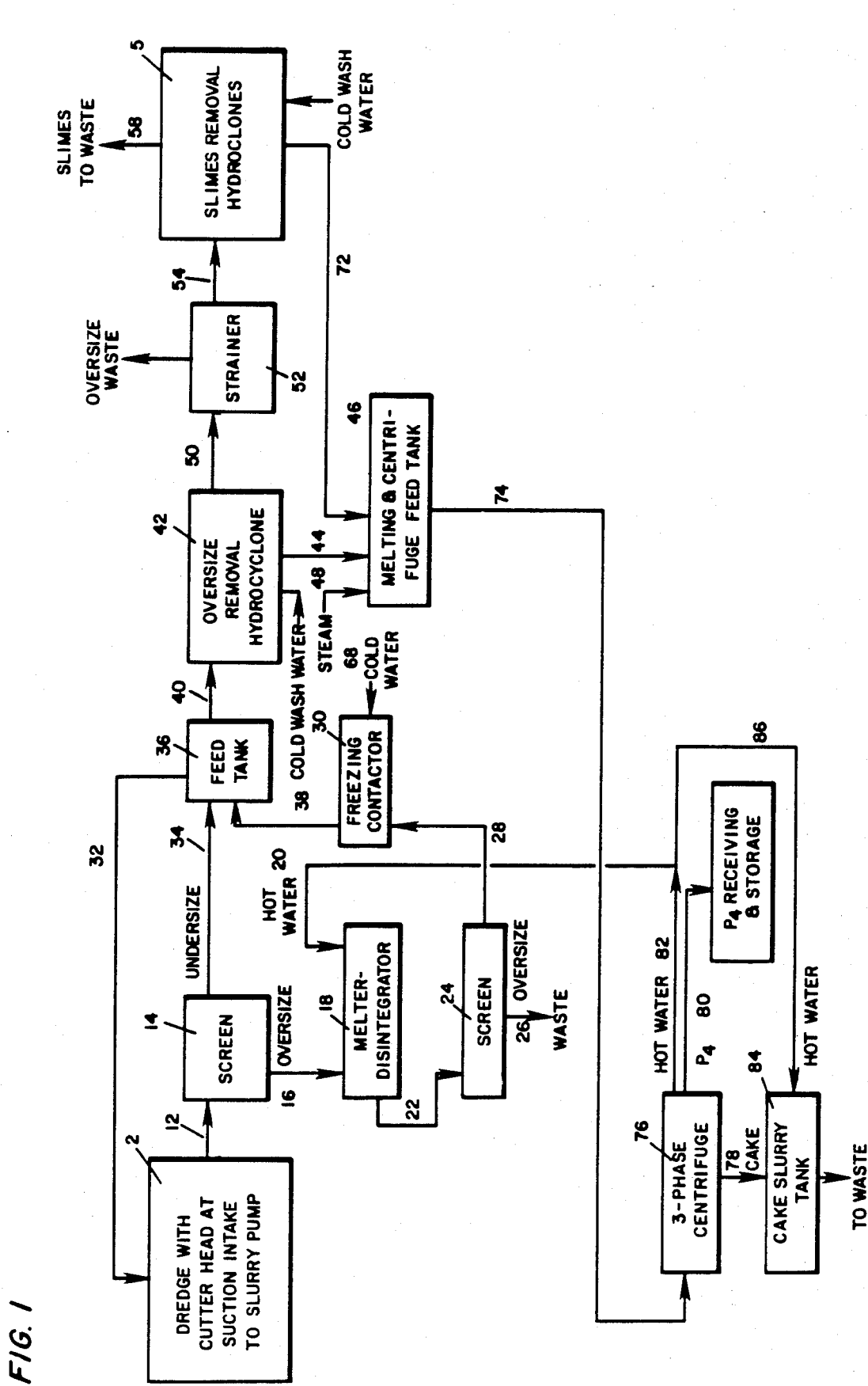
Figure 2:
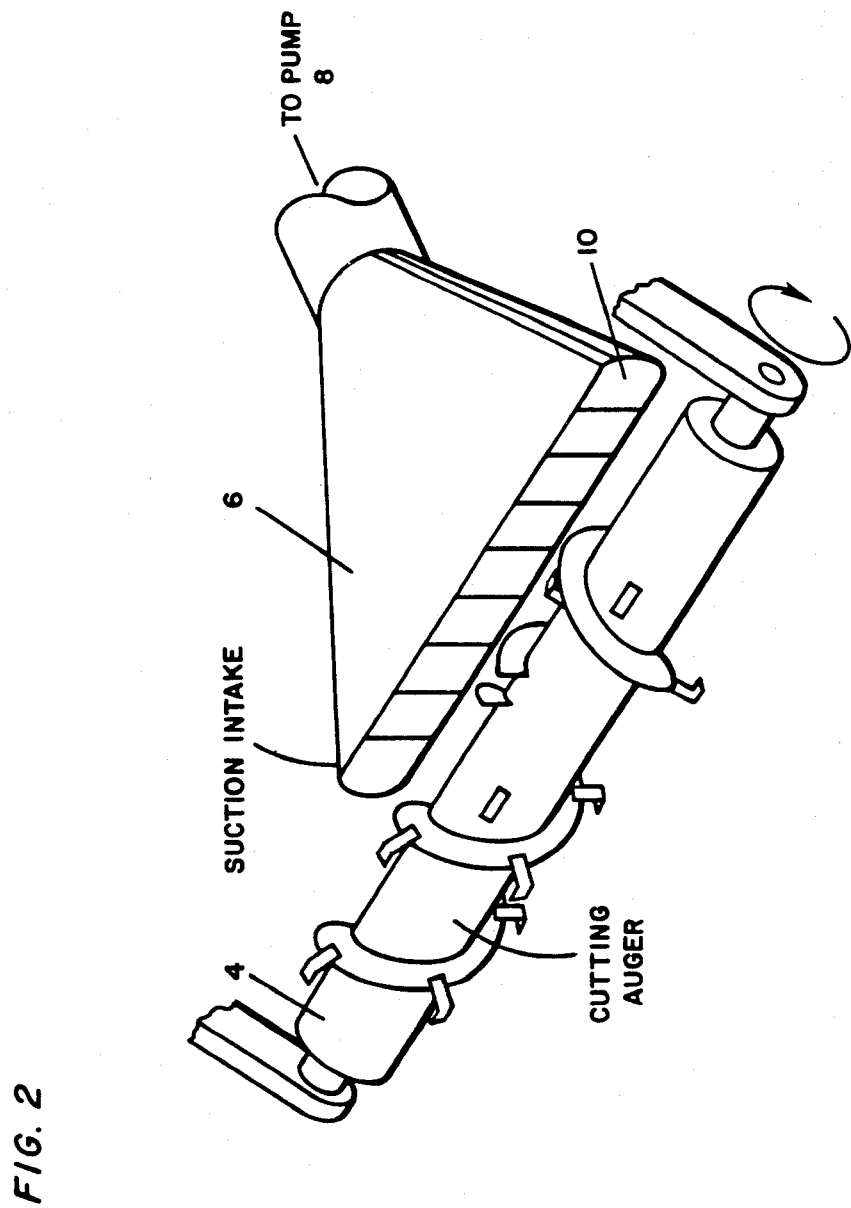

FIG. II illustrates details of the cutting auger and suction intake device used for pond dredging.

FIG. III illustrates operation of hydrocyclones used to separate phosphorus from slimes.

The present invention can best be described with reference to the attached drawings. In FIG. I of the drawings, there is shown a schematic of the flow sheet for carrying out the present system. In the present process, the waste pond 2 is treated by dredging the bottom of the pond to remove solidified phosphorus and dirt. As shown in FIG. II, this is best done by mounting a cutting auger 4 on a barge (not shown) and lowering the auger 4 to the bottom of the pond where it can cut and chop up the solidified phosphorus and dirt into small pieces. Mounted behind the cutting auger 4 is a suction intake 6 connected to a pump 8 which gathers up the pieces of comminuted solidified phosphorus and solidified dirt. This slurry is then pumped to the shore by means of floating conduits (not shown) connecting the barge and the treating equipment on shore. It has been found useful to use a grid 10 in front of the suction intake to prevent excessively large particles from being taken up by the suction intake to avoid plugging the pump.

As shown in FIG. I, the slurry of comminuted phosphorus-containing particles is then conveyed by pipe 12 to a screen 14 to remove particles larger than about 2 mm in diameter. Removal of these larger particles of solidified phosphorus and solidified dirt is necessary to prevent plugging the downstream equipment used to treat the smaller phosphorus-containing particles. In the preferred embodiment, these larger particles are then passed via line 16 into a melter/disintegrator unit 18 in which they are treated with hot water from line 20. During this treatment, these larger particles are subject to agitation in melter 18 with a rotating screw and are kept in contact with the hot water for a period sufficient to melt the phosphorus in the particles. The resulting slurry of molten phosphorus and dirt is then passed via line 22 to a second screen 24 where the oversized particles of sand and other non-meltable components are separated from the slurry of molten phosphorus and finer dirt. The non-meltable particles are removed via line 26 to waste while the slurry of molten phosphorus and dirt is passed via line 28 to a freezing contactor 30. In the freezing contactor 30, the molten phosphorus slurry is treated with cold water via line 68 to freeze the phosphorus to a solid state and thereby form a slurry of the solid phosphorus.

The above treatment of oversized particles (larger than 2 mm) is to separate many larger pieces of relatively pure phosphorus directly without having to put sand and gravel associated with such phosphorus through the entire recovery system. However, if it is desired to obviate the above treatment, it is possible to treat these oversized particles to a simple grinding step and add the ground particles, smaller than 2 mm, directly to the undersized stream for processing as set forth hereinafter.

The fine particles of about 2 mm and smaller which are removed as the undersized fraction 34 from the first screen are then passed into a feed composition tank 36 along with the phosphorus from line 38 that has been treated in the freezing contractor 30. To prevent plugging of lines, the aqueous slurry of frozen phosphorus and dirt is continually pumped at a high rate through the conduits feeding the feed composition tank 36. Any resulting overflow from tank 36 is recycled back to waste pond 2 via line 32. The aqueous slurry of frozen phosphorus and dirt in the feed composition tank 36 is then passed via line 40 to a hydrocyclone 42 to effect a separation of particles larger than about 500 micrometers from those smaller than 500 micrometers.

In general, a hydrocyclone having a diameter of about twenty inches (508 mm) has been found acceptable for this purpose. This separation is necessary to remove larger particles which are essentially solidified phosphorus and solidified dirt from the very fine slimes and fine phosphorus particles which later are treated downstream in smaller hydrocyclones and must be free of larger particles to avoid plugging these smaller hydrocyclones.

The underflow stream 44 from this hydrocyclone containing the larger particles of solidified phosphorus and solidified dirt is passed into a phosphorus melting tank 46 where it is treated with steam via line 48 to melt the phosphorus contained in this fraction. The overflow stream 50 from the hydrocyclone 42 containing the fine dirt slimes and the fine particles of frozen phosphorus is passed into a strainer 52 and from there via line 54 into the first stage of a series of hydrocyclones 56. The hydrocyclones 56 used in this stage and also in the following stages are hydrocyclones each of which has a diameter preferably not above about one inch (25.4 mm). The aqueous stream of frozen phosphorus particles and slimes 54 is introduced under a sufficient pressure drop across the hydrocyclones 56 to separate particles into two separate streams, one having phosphorus-rich particles above about 8–15 micrometers, and another phosphorus-poor particles below about 8–15 micrometers.

The hydrocyclone is a cone shaped unit with a tangential opening in its side so that the material fed into the opening rotates and generates high centrifugal forces, forcing heavier material to be separated in a stream through an opening in the apex of the hydrocyclone (called the "underflow") while the lighter material is removed in a second stream through an opening in the head (called the "overflow"). In the present process, the hydrocyclone is operated so that the separatory point between the particles is in the range of 8–15 micrometers, thereby assuring that the major portion of phosphorus entering the hydrocyclones is removed in the underflow streams while the overflow streams from the hydrocyclones contain the slimes fraction with extremely small amounts of phosphorus. A pressure drop of from 20 to 40 psi (138–276 kilopascals) measured from the hydrocyclone inlet to the overflow exit has been found effective to achieve this separation. In order to use small cyclones of this type in a plant, they are usually set up in parallel in each stage with a common header so that banks of hydrocyclones can be used to process large volumes of feed normally encountered in the plant. Each of the remaining stages of hydrocyclones are connected in series and washed countercurrently as shown in FIG. III, and as described below.

The fine frozen phosphorus particles and slimes from line 54 are conveyed by pump P₁ to the first stage of hydrocyclones 56. The overflow 58 from the hydrocyclones 56 of stage 1, containing mostly slimes with very small amounts of phosphorus, is removed and sent to a waste storage pond. The underflow 60 from the stage 1 hydrocyclones 56 containing the bulk of the phosphorus fed to these hydrocyclones is passed through pump P₂ to the inlet 62 of the stage 2 hydrocyclones 56, and the underflow 64 from stage 2 hydrocyclones is in turn passed through pump P₃ via line 66 to the stage 3 hydrocyclones.

The overflow 68 from the stage 2 cyclone is used to supply the cold water employed in the freezing contractor 30 to freeze liquid phosphorus. In this way, the overflow 68 eventually becomes recycled in part to line 54 as part of the aqueous phosphorus particles slurry entering hydrocyclones 56. The overflow 70 from the hydrocyclones stage 3 is recycled back to line 60 and the prior stage 2 hydrocyclones. Cold wash water is added to lines 60 and 64 to facilitate separation in the hydrocyclones and to prevent clogging of the system. The effect of putting these stages of hydrocyclones in series is to increase the efficiency in separation of slimes from phosphorus particles. The overflow from these hydrocyclones preferably is put in counter-current flow to the feed and such counter-current design minimizes the amount of wash water required to achieve efficient separation of slimes from phosphorus. The underflow from the stage 3 hydrocyclones 72, containing the bulk of the phosphorus separated in the hydrocyclones, is then passed to the phosphorus melting tank 46 and treated with steam to melt the phosphorus in the aqueous slurry by heating it above the melting point at 112° F. (44° C.) preferably to 140° F. (60° C.).

It should be noted that in carrying out this procedure, the separation of phosphorus particles from the slimes is done while the phosphorus is in a solidified form without having to heat the stream which is being passed through the hydrocyclones. This is important because it eliminates large heat requirements which would otherwise be necessary if heating of the entire slurry were required for carrying out the separation of slimes from phosphorus particles. In addition, the aqueous stream 58 which is removed from the stage 1 hydrocyclones through the overflow contains about ¾ of the entire volume of feed slurry which is being processed in this system. Thus, the amount of feed slurry which must be heated in order to melt the phosphorus contained therein is reduced to only a quarter of the volume of recovered slurry, and with it the necessary heat load required to effect phosphorus melting.

The aqueous suspension in the phosphorus melting tank containing globules of phosphorus, heavy dirt, and other solids, is then passed via line 74 into a centrifuge 76 designed to break emulsions and concurrently remove solids. In the centrifuge 76, a first stream 78 of heavy dirt solids is removed as waste; a second stream 80 of relatively pure phosphorus is recovered; and a third stream 82 of phossy water is separated. The purified phosphorus stream 80 is sent to storage while the hot phossy water 82 is sent to a water recycle tank (not shown) for use in distributing hot phossy water which is required, such as to line 20 for use in melter 18. The heavy dirt solids stream 78 from the centrifuge, which contains some trapped phosphorus that is unable to be separated in the centrifuge, is slurried with hot water from line 86 in a tank 84 and pumped to a waste storage pond for disposal.

The following example is given to illustrate the invention and is not deemed to be limiting thereof.

EXAMPLE

In carrying out the present invention in accordance with the flow sheet set forth in FIGS. I and III, for recovery of about 13 thousand pounds of phosphorus per hour (99 Kg/sec), the following table indicates the major streams in the process and the contents of these streams in the practice of the process. Water additions at various stages in the process are not shown but are included in the total flow rate of the indicated streams.

In the attached table, note that in the hydrocyclone treating stage, stream 72 leaving the hydrocyclones contains 97.48% of the phosphorus entering the hydrocyclones via stream 54, indicating a high efficiency removal of phosphorus from the last of the series of hydrocyclones being fed. The overall phosphorus recovery efficiency is 85.2%.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

TABLE

ENGLISH UNITS

| | Stream No. | | | | | |
|---|---|---|---|---|---|---|
| | 12 | 16 | 22 | 26 | 28 | 32 |
| Flow Rate (gpm) | 786.1 | 8.9 | 94.3 | 0.4 | 94.3 | 300 |
| P₄ Content (thousand lbs/hr.) | 21.58 | 6.9 | 6.9 | 0.138 | 6.77 | 6.15 |
| Dirt Content (thousand lbs/hr) | 64.7 | 1.7 | 1.7 | 0.345 | 1.38 | 21.3 |
| Temperature (°F.) | 50 | 50 | 134 | 134 | 134 | 59 |

| | 34 | 38 | 40 | 44 | 50 & 54 | 58 |
|---|---|---|---|---|---|---|
| Flow Rate (gpm) | 776.6 | 275.6 | 751.8 | 23.4 | 747.3 | 574.5 |
| P₄ Content (thousand lbs/hr) | 14.67 | 6.89 | 15.4 | 3.08 | 12.33 | 0.185 |
| Dirt Content (thousand lbs/hr) | 63.0 | 11.7 | 53.36 | 1.03 | 52.33 | 34.54 |
| Temperature (°F.) | 50 | 83 | 59 | 56 | 59 | 59 |

| | 60 | 62 | 64 | 66 | 68 | 70 |
|---|---|---|---|---|---|---|
| Flow Rate (gpm) | 172.8 | 318.0 | 136.7 | 238.5 | 181.3 | 125.7 |
| P₄ Content (thousand lbs/hr) | 12.15 | 12.23 | 12.1 | 12.1 | 0.122 | 0.085 |
| Dirt Content (thousand lbs/hr) | 17.79 | 21.85 | 11.6 | 11.6 | 10.3 | 4.05 |
| Temperature (°F.) | 59 | 56 | 56 | 53 | 56 | 53 |

| | 72 | 74 | 78 | 80 | 82 | |
|---|---|---|---|---|---|---|
| Flow Rate (gpm) | 112.8 | 144.2 | 28.5 | 15.8 | 99.9 | |
| P₄ Content (thousand lbs/hr) | 12.02 | 15.1 | 1.97 | 13.1 | — | |
| Dirt Content (thousand lbs/hr) | 7.52 | 8.55 | 7.86 | 0.69 | — | |
| Temperature (°F.) | 53 | 140 | 140 | 140 | 140 | |

TABLE

METRIC UNITS

| Stream No. | 12 | 16 | 22 | 26 | 28 | 32 |
|---|---|---|---|---|---|---|
| Flow Rate (l/s) | 49.3 | 0.56 | 5.95 | 0.025 | 5.95 | 18.9 |
| $P_4$ Content (kg/s) | 5.99 | 1.92 | 1.92 | 0.038 | 1.88 | 1.71 |
| Dirt Content (Kg/s) | 17.98 | 0.47 | 0.47 | 0.096 | 0.38 | 5.92 |
| Temperature (°C.) | 10 | 10 | 57 | 57 | 57 | 15 |

| Stream No. | 34 | 38 | 40 | 44 | 50 & 54 | 58 |
|---|---|---|---|---|---|---|
| Flow Rate (l/s) | 50.0 | 17.4 | 47.4 | 1.48 | 47.1 | 36.2 |
| $P_4$ Content (Kg/s) | 4.075 | 1.91 | 4.28 | 0.86 | 3.425 | 0.051 |
| Dirt Content (Kg/s) | 17.5 | 3.25 | 14.8 | 0.09 | 14.54 | 9.59 |
| Temperature (°C.) | 10 | 28 | 15 | 14 | 15 | 15 |

| Stream No. | 60 | 62 | 64 | 66 | 68 | 70 |
|---|---|---|---|---|---|---|
| Flow Rate (l/s) | 10.9 | 20.1 | 8.62 | 15.0 | 11.4 | 7.93 |
| $P_4$ Content (Kg/s) | 3.375 | 3.40 | 3.36 | 3.36 | 0.034 | 0.024 |
| Dirt Content (Kg/s) | 4.94 | 6.07 | 3.22 | 3.22 | 2.86 | 1.125 |
| Temperature (°C.) | 15 | 13 | 13 | 12 | 13 | 12 |

| Stream No. | 72 | 74 | 78 | 80 | 82 |
|---|---|---|---|---|---|
| Flow Rate (l/s) | 7.1 | 9.1 | 1.8 | 1.00 | 6.3 |
| $P_4$ Content (Kg/s) | 3.33 | 4.19 | 0.55 | 3.64 | — |
| Dirt Content (Kg/s) | 2.09 | 2.375 | 2.18 | 0.19 | — |
| Temperature (°C.) | 12 | 60 | 60 | 60 | 60 |

What is claimed is:

1. A process for recovering phosphorus from waste ponds comprising dredging the waste pond to obtain an aqueous slurry containing comminuted, frozen phosphorus-containing particles, screening an oversized fraction containing particles larger than about 2 mm from an undersized portion in said slurry, feeding said undersized fraction into an initial hydrocyclone, removing a first underflow stream from said initial hydrocyclone having phosphorus-containing solids larger than about 500 micrometers, heating said first underflow stream to melt the phosphorus therein, removing a first overflow stream from said initial hydrocyclone having particles smaller than about 500 micrometers and introducing said first overflow stream into a plurality of hydrocyclones each having a diameter less than said initial hydrocyclone, removing a second overflow stream containing particles smaller than about 8–15 micrometers from at least one of said plurality of hydrocyclones diminished in phosphorus and enriched in slimes, removing a second underflow stream containing particles larger than about 8–15 micrometers from at least one of the plurality of hydrocyclones enriched in phosphorus and diminished in slimes, heating said second underflow stream sufficiently to melt the phosphorus in said stream, introducing said second underflow stream containing molten phosphorus into a centrifugal separator, removing a coalesced phosphorus stream as product from said separator, and a fraction of heavier dirt containing minor amounts of phosphorus as a waste stream.

2. A process for recovering phosphorus from waste ponds comprising dredging the waste pond to obtain an aqueous slurry containing comminuted, frozen phosphorus-containing particles, screening an oversized fraction containing particles larger than about 2 mm for an undersized portion in said slurry, heating said oversized fraction above the melting point of phosphorus, separating an aqueous dispersion of molten phosphorus from particles of dirt larger than 2 mm, cooling said aqueous dispersion to a temperature below the melting point of phosphorus to form a chilled stream containing frozen phosphorus, feeding said chilled stream and said undersized fraction previously separated into an initial hydrocyclone, removing a bottom stream from said initial hydrocyclone having phosphorus-containing solids larger than about 500 micrometers, heating said bottom stream to melt the phosphorus therein, removing a top stream from said initial hydrocyclone having particles smaller than about 500 micrometers and introducing said top stream into a series of hydrocyclones each having a diameter less than said initial hydrocyclone, removing an overflow stream containing particles smaller than about 8–15 micrometers from at least one of the series of hydrocyclones diminished in phosphorus and enriched in slimes, removing an underflow stream containing particles larger than about 8–15 micrometers from at least one of the series of hydrocyclones enriched in phosphorus and diminished in slimes, heating said underflow stream sufficiently to melt the phosphorus in said stream, introducing said underflow stream containing molten phosphorus and said bottom stream containing molten phosphorus into a centrifugal separator, removing a coalesced phosphorus stream as product from said separator, and a fraction of heavier dirt containing minor amounts of phosphorus as a waste stream.

3. Process of claim 2 wherein said series of hydrocyclones are made up of hydrocyclones having a diameter not larger than about one inch.

4. Process of claim 2 wherein said series of hydrocyclones are comprised of a plurality of cyclones connected in stages, wherein the hydrocyclones in each stage are connected in parallel and each of the stages are connected in series flow.

5. Process of claim 4 wherein said overflow stream from said series of hydrocyclones is from the first stage of the series of hydrocyclones being fed, and the overflow from the remaining stages is fed back to dilute the feed to such stages.

6. Process of claim 4 wherein said underflow stream from said series of hydrocyclones is from the last stage of the series of hydrocyclones being fed.

* * * * *

UNITED STATES PATENT AND TRADEMARK OFFICE
CERTIFICATE OF CORRECTION

PATENT NO. : 4,492,627

DATED : January 8, 1985

INVENTOR(S) : David A. Crea

It is certified that error appears in the above—identified patent and that said Letters Patent is hereby corrected as shown below:

Column 8, line 7, "for" should read --from--.

Signed and Sealed this

Tenth Day of September 1985

[SEAL]

Attest:

DONALD J. QUIGG

Attesting Officer     Acting Commissioner of Patents and Trademarks - Designate